July 11, 1950     W. R. PENMAN     2,514,589
SCREW THREAD FOR HIGH STRENGTH BOLTING
Filed Aug. 23, 1945
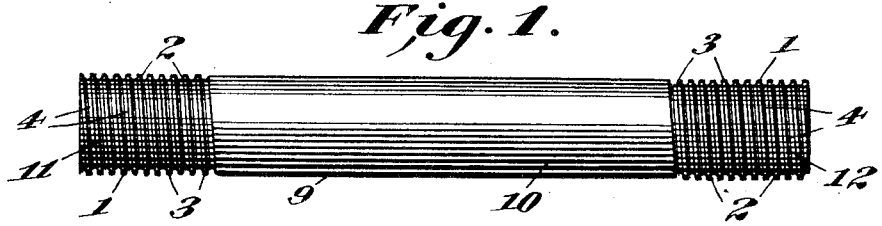
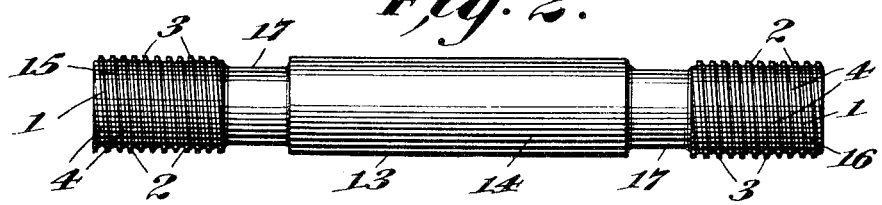
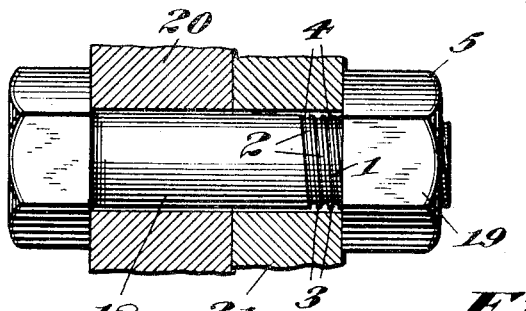
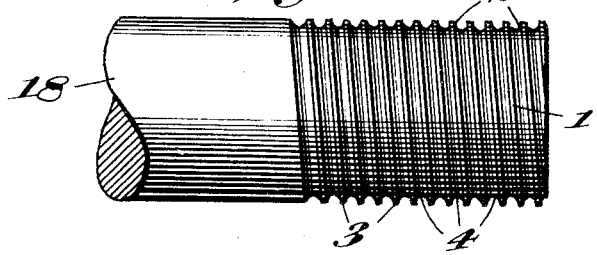
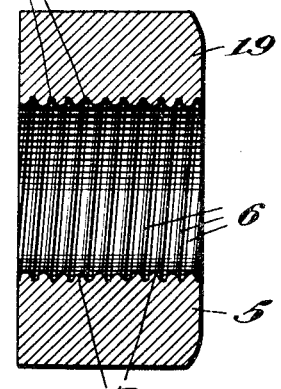
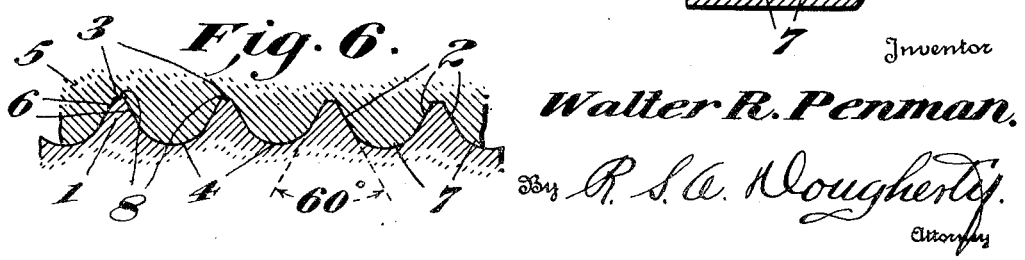
Inventor
Walter R. Penman.
By R. S. A. Dougherty
Attorney Patented July 11, 1950

2,514,589

UNITED STATES PATENT OFFICE 2,514,589

SCREW THREAD FOR HIGH STRENGTH BOLTING

Walter R. Penman, Lebanon, Pa., assignor to Bethlehem Steel Company, a corporation of Pennsylvania Application August 23, 1945, Serial No. 612,213

6 Claims. (Cl. 85—46)

My invention relates to stud bolt and nut construction and more particularly to an improvement in the thread construction of the threads of the nut in relation to the threads of the stud, bolt and the coacting nut or the like therewith.

Threads are used for fastenings, for adjustment and for transmitting power or motion. For these different purposes several different forms of threads are in use. For fastenings the American Standard V-thread, 60° with its crest and root flattened, is used to a great extent in this country.

The sharp V thread at 60° is still used to some extent although it has little to recommend it except its increased holding for set screws. The British Standard is the Whitworth thread cut at 55°, with tops and bottom rounded one-sixth of the depth of the triangle. The British Association Standard at 47½° is used on very small screws. The French and International Standards have the same form as the American Standard but are dimensioned in the metric system.

For transmitting power or motion these V-shapes are not desirable, as part of the thrust tends to burst the nut. A square thread avoids this as it transmits all the forces parallel to the axis of the screw. It can have, evidently, only half the number of threads in the same space as a V-thread of the same width and thus in shear is only half as strong. A modification used very generally is the Acme or 29° thread with a flat crest and root. It is stronger, much more easily cut, and permits the use of a disengaging or split nut, which cannot be used on a square thread. The Brown and Sharpe worm thread for transmitting power to a worm wheel resembles the Acme thread but has a longer tooth. The buttress thread has one side of the thread straight and the other side 45° with a slight flattened crest and root is used for transmitting power in one direction and has the advantage of a square thread and the strength of the V-thread. It is sometimes called the breech-lock thread as it is used to take the recoil in guns. The knuckle thread is used for rough work and can be cast in a mold. This thread is formed with the crest and root rounded and the same radius.

In all of the above mentioned standard threads now in use the cross-section of the threads and the space between the threads of the male and female members are the same, while the thread shown in applicant's drawing the tooth of the male member has a different shape and cross sectional area to that of the female member.

The purpose of my thread is specifically to increase the fatigue limit of the threaded section, that is to produce a thread that will carry a greater load and have a greater life under extreme conditions of fluctuating stresses of stress reversals. In a service test it has proven that it will do this.

Other objects and advantages of my invention will become more apparent from the following specification and the accompanying sheet of drawings in which like characters of reference indicate like parts.

Figure 1 is a side elevation of a stud having a male thread at each end with a cylindrical body portion of uniform thickness.

Fig. 2 is a side elevation of another type of stud threaded at each end showing the central cylindrical body portion of uniform thickness with annular recessed portions at the ends thereof adjacent to the threaded ends.

Fig. 3 is a side elevation of a headed bolt with a nut on the threaded end shown clamping two members together which are shown in section.

Fig. 4 is a side elevation of the threaded end of a bolt or stud drawn on a somewhat larger scale than in Figs. 1 to 3.

Fig. 5 is a longitudinal section of a nut having a female thread therein and adapted to be applied to the male threaded end of the bolt or stud shown in Fig. 4, and Fig. 6 is a detail section view drawn on a larger scale to show more clearly the profile of the male and female threads.

Referring now to the accompanying sheet of drawings the numeral 1 indicates the male thread the profile of which is shown more clearly in Fig. 6 having 60° angular sides as at 2, with a narrower flattened crest or top as at 3 and a rounded root or bottom between the teeth of comparatively long radius as at 4. The thread of the coacting female member 5 to match the male thread 1 of the member is also shown more clearly in Fig. 6 and is provided with 60° angular sides 6, crests 7 of comparatively long radius and narrow flat roots or bottoms 8 of the grooves between the teeth. As the profile of the male and female threads are indicated the same in all the figures these reference numerals will apply thereto in all the figures where they occur.

In Fig. 1 I have shown a stud 9 having a cylindrical body portion 10 of uniform thickness with threaded ends 11 and 12. In Fig. 2 a stud 13 is shown having a cylindrical central body portion 14 of uniform thickness and threaded ends 15 and 16 with an annular recess 17 between each of the threaded end portions 15 and 16 and the central body portion 14.

In Fig. 3, I have illustrated my improved thread applied to a headed bolt 18 having a nut 19 thereon adapted for clamping together two bars or plate members 20 and 21. Fig. 4 shows the threaded end portion of the bolt 18 or the like, and Fig. 5 shows a longitudinal section of the coacting nut 19 both of these last two mentioned figures being drawn on a slightly larger scale than those shown in Figs. 1 to 3.

In my invention I have eliminated the sharp corners at the root of the male thread and the coacting crest of the female thread. The loading on the teeth is better distributed than in what may be termed the normal uniform type of thread.

For illustration I have shown and described my improved screw threads for use with studs, bolts and nuts, but is applicable for pipe or rod couplings equally as well.

Although I have shown and described my invention in considerable detail, I do not wish to be limited to the exact and specific details shown and described, but I may use such substitutions, modifications or equivalents thereof, as are embraced within the scope of my invention or as are pointed out in the claims.

Having thus described my invention what I claim as new and desire to secure by Letters Patent is:

1. A tight fitting screw connection comprising a male and a complementary female coacting member, said male member having a truncated V-shaped thread in cross section with a concaved root of long radius and a narrow flattentd crest, the female member having a thread of greater cross sectional area than the thread of the male member and provided with a crest having a long radius and a narrow flattened root, side surfaces for the threads formed with a 60° angle extending tangentially from the concaved root of long radius of the male member and the crest of long radius of the female member to the narrow flattened crest of the male member and the narrow flattened root of the female member.

2. A screw connection consisting of a male member and a complementary female member, each having contact engaging surfaces of the same profile but with the thread of one member having a different shape and of substantially greater cross sectional area than the thread of the mating complementary member, the male member having the thread formed with a concaved root of long radius and a narrow flattened crest, and the female complementary member having a convex crest of long radius and a narrow flattened root, and sides for the threads formed with a 60° angle extending tangentially from the root or crest of long radius portions of the threads to the narrow flattened crest or root of said male and female members.

3. A screw connection consisting of a male and a female complementary member, the thread of the male member formed with a concaved root of long radius and a narrow flattened crest, side surfaces for the thread of the male member formed with a 60° angle extending tangentially from the concaved root of long radius to the narrow flattened crest, the thread of the female complementary member having a greater cross sectional area than the thread of the male member and provided with a convex crest of long radius and a narrow flattened root, and side surfaces for the thread formed with a 60° angle extending tangentially from the convex crest of long radius to the narrow flattened root of said female member.

4. A screw connection consisting of a male member and a female complementary member, one of said members having a thread formed with a concaved root of long radius and a narrow flattened crest, side surfaces for the thread formed with a 60° angle extending tangentially from the concaved root of long radius to the narrow flattened crest, and the other coacting member having a thread of greater cross sectional area formed with a convex crest of long radius and a narrow flattened root, and side surfaces for the thread formed with a 60° angle extending tangentially from the convex crest of long radius to the narrow flattened root.

5. A tight fitting screw connection comprising a male and a complementary female mating member, the thread of one member having a root of long radius and a narrow flattened crest, side surfaces for the thread formed with a 60° angle extending tangentially from the concaved root of long radius to the narrow flattened crest, the thread of the mating member having substantially twice the cross sectional area with a crest of long radius and a narrow flattened root, and side surfaces for said thread formed with a 60° angle extending tangentially from the crest of long radius to the narrow flattened root.

6. A screw connection consisting of a male member and a female complementary mating member, the male member having a thread formed with a concaved root of long radius and a narrow flattened crest, side surfaces for the thread formed with a 60° angle extending tangentially from the concaved root of long radius to the narrow flattened crest, the complementary mating female member having a substantially greater cross sectional area than the thread of the male member and provided with a convex crest of long radius and a narrow flattened root, and side surfaces for the thread formed with a 60° angle extending tangentially from the convex crest of long radius to the narrow flattened root.

WALTER R. PENMAN.

REFERENCES CITED

The following references are of record in the file of this patent:

UNITED STATES PATENTS

| Number | Name | Date |
|---|---|---|
| 271,852 | Hull | Feb. 6, 1883 |
| 1,733,392 | Barra | Oct. 29, 1929 |
| 1,860,522 | Arnold | May 31, 1932 |
| 2,119,994 | Love | June 7, 1938 |

FOREIGN PATENTS

| Number | Country | Date |
|---|---|---|
| 729,138 | France | Apr. 25, 1932 |